July 16, 1940.  C. R. HANNA  2,208,421
SERVOMOTOR CONTROL
Filed May 22, 1937  3 Sheets-Sheet 1

WITNESSES:
C. J. Weller.
Joe Weber

INVENTOR
Clinton R. Hanna.
BY
M. Crawford
ATTORNEY

July 16, 1940.  C. R. HANNA  2,208,421
SERVOMOTOR CONTROL
Filed May 22, 1937   3 Sheets-Sheet 2

WITNESSES:
C. J. Welles
Joe Weber

INVENTOR
Clinton R. Hanna.
BY
ATTORNEY

July 16, 1940.

C. R. HANNA 2,208,421

SERVOMOTOR CONTROL

Filed May 22, 1937

WITNESSES:
C. J. Weller.
Joe Weber.

INVENTOR
Clinton R. Hanna.
BY
ATTORNEY

Patented July 16, 1940

2,208,421

UNITED STATES PATENT OFFICE 2,208,421

SERVOMOTOR CONTROL

Clinton R. Hanna, Pittsburgh, Pa., assignor to Westinghouse Electric & Manufacturing Company, East Pittsburgh, Pa., a corporation of Pennsylvania Application May 22, 1937, Serial No. 144,177

7 Claims. (Cl. 121—46.5)

My invention relates, generally, to hydraulically operated power translating systems or devices and more particularly, to a valve for controlling the fluid flow to and from a device of this character.

In the operation of hydraulic systems for multiplying power, it is common practice to control the flow of fluid to the hydraulic working device, such as a piston, by means of valves which connect the source of fluid pressure to the piston and are operated in accordance with the desired motion of the piston. When such valves are electrically operated, it is found that a relatively large amount of power is necessary to operate the valves to secure the desired results.

The necessity for considerable electrical power for operating such hydraulic systems arises from the fact that the valves must control appreciable quantities of fluids at relatively high pressures and from the fact that friction must be overcome between a valve operating stem which connects the valve with the electrical translating device and a packing gland.

In signalling systems and remote control systems, the amount of power available for operating translating devices is usually very small and is insufficient to operate such apparatus as hereinbefore described.

An object of my invention is to provide for controlling a reversible hydraulic power multiplying and translating device by means of a very small amount of control power or energy.

Another object of my invention is to provide a control valve for a reversible hydraulic power translating device which shall be operable by an electrical translating device which is responsive to a very small amount of electrical energy.

Another object of my invention is to provide an electrical control valve which shall be so constructed as to contain the electrical translating element within the valve chamber.

A further object of my invention is to provide a control device for a reversible hydraulic power translating device in which valves controlling fluid flow to and from said translating device are operated by the pressure in the hydraulic system and selection of the direction of operation is made by electrically operated pilot valves.

Another object of my invention is to provide a hydraulically operated multiplier valve having an electrical pilot valve control which shall be simple and efficient in operation and which may be easily and economically manufactured.

These and other objects and advantages of my invention will be apparent from the following description taken in connection with the accompanying drawings, in which.

Figure 1:
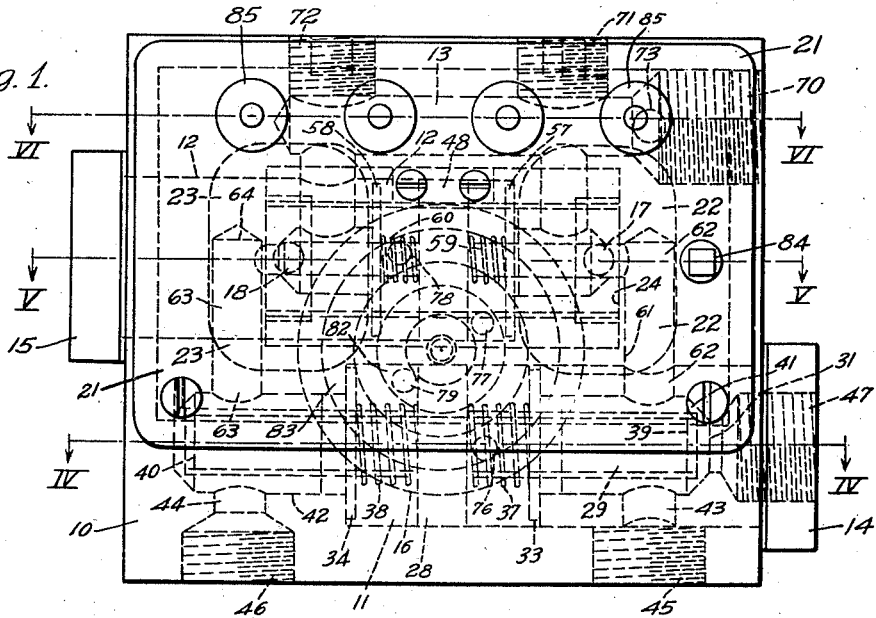
Figure 1 shows a plan view of the preferred embodiment of my invention with some of the parts shown in broken lines.
Figure 4:
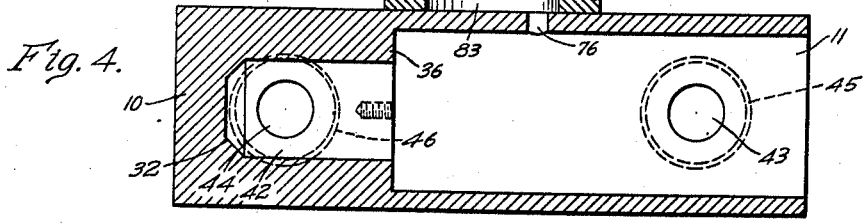
Figure 5:
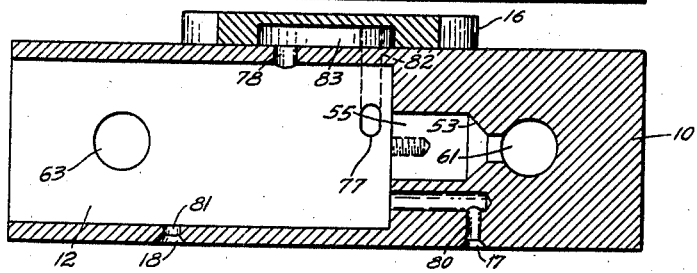
Figure 6:
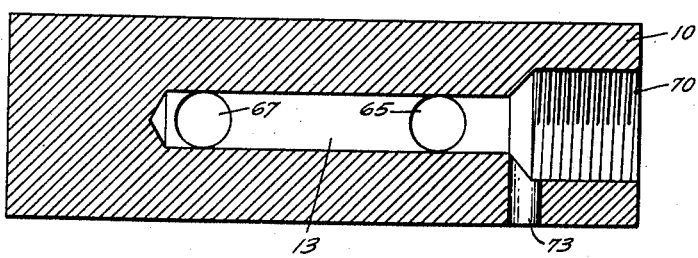
Figure 7:
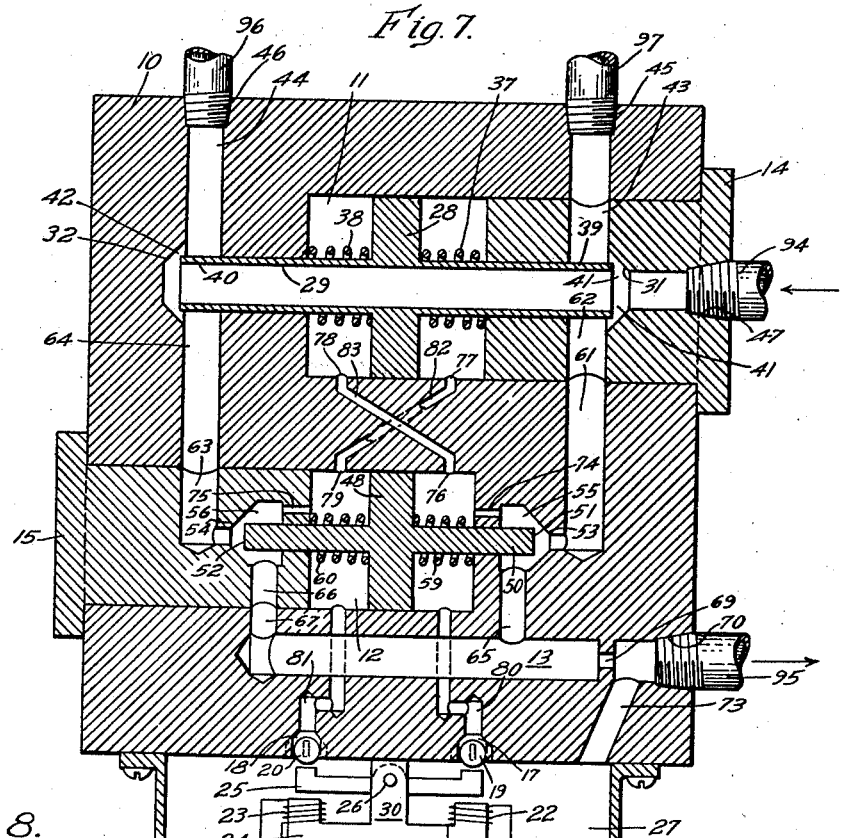
Figure 8:
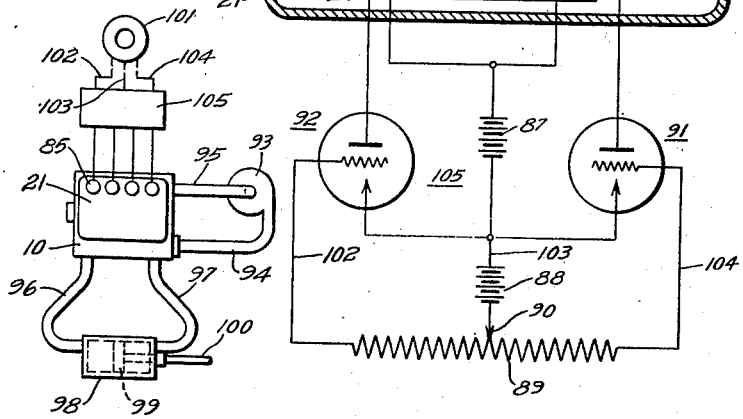

Fig. 4 shows a sectional view of the valve body taken along line IV—IV of Fig. 1 with the valve mechanism and body inserts removed, Fig. 5 shows a sectional view of the valve body along line V—V of Fig. 1 with the valve mechanism and body inserts removed, Fig. 6 shows a sectional view of the valve body along the line VI—VI of Fig. 1 with the valve mechanism and body inserts removed, Fig. 7 is a diagrammatic illustration of essential elements of the invention in their cooperative relationship; and, Fig. 8 is a diagrammatic illustration of the relationships between the multiplier valve device and the source of fluid pressure and an operating piston or other fluid pressure operated device, the fluid flow to which is governed by the multiplier valve.

In the preferred embodiment of my invention, a hydraulically-operated valve is provided for selectively directing fluid flow from a source of fluid pressure to the piston of a hydraulic power translating device. A second hydraulically-operated valve is provided for selectively directing the fluid discharge from the hydraulic translating device to the fluid circulating system. A restriction in the discharge system permits a pressure difference to be built up in the control device and this pressure difference is utilized to operate the hydraulic valves. Normally, the valves permit no flow of fluid through the system with neither of the valves selecting the direction of flow. Selection of direction of flow of the operating fluid is accomplished by two electrically-actuated pilot valves which connect the two sides of the hydraulic valve operating pistons to the fluid discharge.

The electrically-actuated pilot valves are so controlled as to close one outlet of the hydraulic valves to the discharge at the same time opening the other outlet. This results in a difference in pressure on the two sides of each of the hydraulic valve operating pistons and causes them to actuate their respective inlet and outlet valves. The direction of operation is governed by the operation of the electrically-operated pilot valves in selectively opening or closing passages to the discharge from the hydraulic valve operating cylinders. In this way it is seen that only the pressure in the device caused by the restriction in the valve discharge need be directly controlled by the electrically-actuated pilot valves and as this pressure may be very small only a very small quantity of electrical energy is required to operate the pilot valves. The energy for operating both the hydraulic translating device and its control valves is supplied by the source of hydraulic pressure.

Referring to Figs. 1 through 7, a valve body 10 is provided with piston chambers 11 and 12 which serve as cylinders for the main valve operating piston 28 and the auxiliary valve operating piston 48, respectively. An insert 14 extends into piston chamber 11 to complete a closed cylinder in which piston 28 may reciprocate. An insert 15 is placed in piston chamber 12 for the same purpose.

Valves 39 and 40 are carried by a tubular stem 29 attached to piston 28 and are positioned to cooperate with valve seats 31 and 32, respectively, when moved to the right or left by piston 28. Piston 28 is centered by springs 37 and 38 in a position which will permit fluid flow from each end of the valve stem 29. It will be noted that when the valve stem is moved to the left-hand position, communication between the inside of the stem and the transfer chamber 42 is cut off and communication between the transfer chamber 41 and the inside of the stem is established and the valve opening between these two chambers is made larger. Plates 33 and 34 are secured to the end 35 of insert 14 and shoulder 36 of body member 10, respectively, and serve to seal off the piston chamber 11 from the transfer chambers 41 and 42. These inserts also serve as abutments for the centering springs 37 and 38.

The auxiliary valve piston 48 actuates valves 51 and 52 through stem 50 to seat upon valve seats 53 and 54, respectively. These valves control the flow of fluid from chamber 41 through passages 61 and 62 to chamber 55 and from transfer chamber 42 through passages 63 and 64 to chamber 56 and are so positioned as to permit increased flow between one seat of these chambers while operating to decrease the flow between the other seat of these chambers. Discs 57 and 58 seal off the piston chamber 12 from chambers 55 and 56 and serve as abutments for the centering springs 59 and 60 for piston 48.

The discs 57 and 58 are provided with restricted passages 74 and 75 to permit flow of fluid to the piston chamber 12 from chambers 55 and 56. Chambers 55 and 56 are interconnected through discharge chamber 13 by passages 65, 66 and 67. An insert 68 having a restricted opening 69 is placed in the outlet of discharge chamber 13 to discharge outlet 70.

Outlet and/or inlet openings 45 and 46, which may be connected to the piston device whose operation is to be controlled by the valve device, are connected with transfer chambers 41 and 42 by passages 43 and 44, respectively. The inlet chamber 47 of the valve communicates with transfer chamber 42 when valve 39 is seated and with transfer chamber 41 when valve 40 is seated and with both transfer chambers 41 and 42 when neither of the valves is seated.

The inlet chamber 47 and discharge outlet 70 are to be connected to a source of hydraulic pressure with inlet chamber 47 acting as the inlet to the valve and discharge outlet 70 acting as the outlet from the valve to the source of pressure. Plugs 71 and 72 are merely inserts provided to fill openings which were made for convenience of manufacture.

A housing 21 is secured to one side of the valve body 10 and an electromagnetic device 30 is mounted in this housing to operate pilot valves 19 and 20. The electromagnetic valve operating device 30 comprises a core 24 having legs upon which are mounted coils 22 and 23 to selectively actuate armature 25 which, in turn, controls the movement of valves 19 and 20 to vary the opening between these valves and their seats 17 and 18. The valves 19 and 20 are so constructed as to cause an increase in the opening of one of the valves while causing a decrease in the other valve opening. Passages 80 and 81 connect chamber 27 formed by the body member 10 and casing 21 with the cylinder 12 on opposite sides of the piston 48 and the flow through passages 80 and 81 is governed by the valves 19 and 20, respectively.

Connection between the piston chamber 11 on the right-hand side of piston 28 and the piston chamber 12 on the left-hand side of piston 48 is established by providing passages 76 and 78 through the body portion 10 and interconnecting these passages by a circular groove in the transfer plate 16 which is secured on the opposite side of valve body 10 from housing 21.

Connection between the piston chamber 11 of the left-hand side of the piston 28 and piston chamber 12 on the right-hand side of piston 48 is established by providing passages 79 and 77 from these cylinder chambers through the body 10 and interconnecting them with a circular groove 83 in the transfer plate 16. The position of these passages is best shown in Figs. 1, 2, 4 and 5.

Communication between the chamber 27 and the discharge outlet 70 is provided by passage 73.

Figure 2:
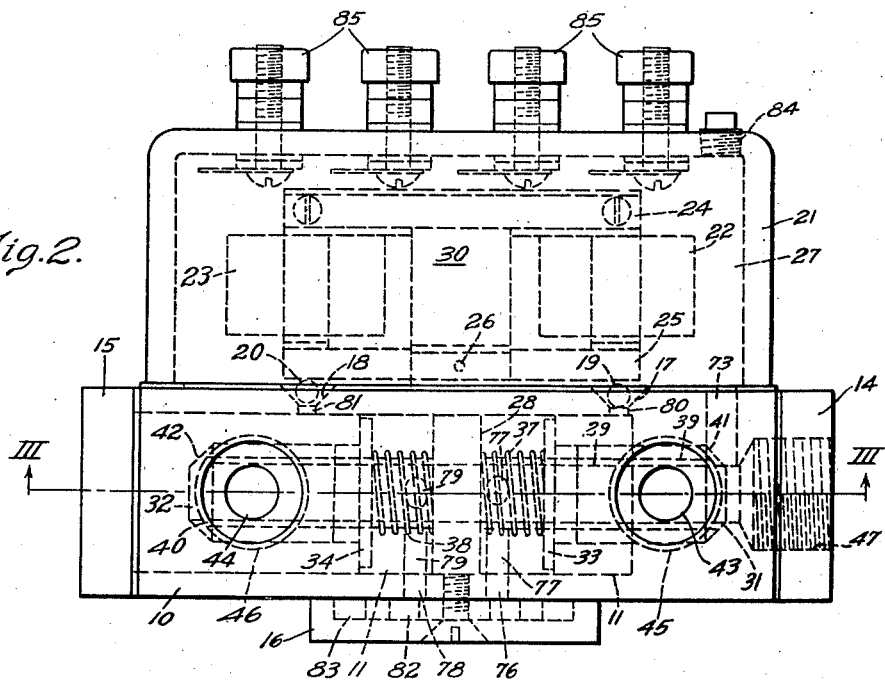
Fig. 2 shows a side elevation view of the device.
Figure 3:
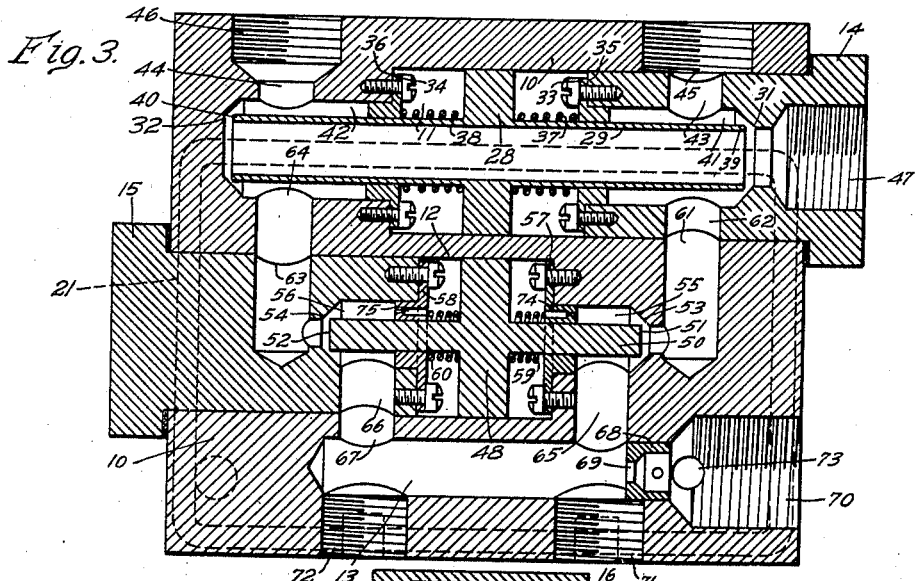
Fig. 3 shows a section view of Fig. 2 taken along the line III—III thereof.

As shown in Fig. 2, plug 84 is provided to fill an opening in casing 21 which is provided for convenience in inserting fluid to the hydraulic system. Binding posts 85 are provided for establishing electrical connection with coils 22 and 23 inside the casing 21.

The relation of the multiplier valve to a complete operating system may be best understood by reference to Fig. 8, in which a remote control device 101 may be moved to control the movement of an element 100. While this control device may be any of many well known devices in the art, I have shown in Fig. 7 a control system which will operate for the desired purpose. This system comprises a variable resistor 89 connected in circuit with conductors 102, 103 and 104 through a battery 88 and a movable contact member 90. The contact member 90 may be the movable element of the remote control device 101. A receiver amplifying device 105 may be connected in this system. Such receiver may comprise two amplifying tubes 91 and 92 connected to the coils 22 and 23 and battery 87, as illustrated to amplify the current received from the remote control device 101.

In the operation of this electrical control system, variation of the resistor 89 at the remote control station would cause variation in the current in coils 22 and 23, such that the current in coil 22 would increase as the current in coil 23 would decrease and would thus cause variation in the openings of valves 19 and 20, and the difference in the openings of valves 19 and 20 would be governed by the difference in current in coils 22 and 23.

A pump or other source of fluid pressure 93 may be connected by fluid conductors 95 and 94 to the outlet and inlet of the valve device, respectively, and element 100 is moved in accordance with the movement of a piston or work member 99 in cylinder 98, the elements 98, 99 and 100 comprising what is commonly known as a servo-motor, the two sides of the piston being connected by fluid inlet and/or outlet conductors 96 and 97 to the chambers 45 and 46.

Operation of the system is best understood by reference to Fig. 7. In the normal operation of the device when no movement of the controlled element 100 is desired, the elements of the valve device are in the position shown in Fig. 7. With the elements in this position, fluid from the source of fluid pressure is entering the transfer chamber 41, is flowing through passages 62 and 61 through valve 51, through passage 65, discharge member 13, passage 69 and outlet 70 and back to the source of fluid pressure. At the same time fluid is flowing from the source of fluid pressure through the tube 29 into transfer chamber 42 through passages 63 and 64 into chamber 56, through passages 66, 67, discharge chamber 13, passage 69 and outlet 70 back to the source of fluid pressure. Also at this time fluid is flowing from chamber 55 through restricted passage 74 into the piston chamber 12 on the right-hand side of piston 48, through passage 80 and valve 19 to chamber 27, and from chamber 27 through passage 73 and outlet 70 back to the source of fluid pressure. In a similar manner fluid is flowing from chamber 56 through passage 75 into piston chamber 12 on the left-hand side of piston 48 and through passage 81 and valve 20 to chamber 27. With the valves 39 and 40 in the neutral position shown in Fig. 7, there will be equal pressures applied to the piston 99 through the conductors 96 and 97.

The restricted passage 69 causes a difference in fluid pressure on the two sides of this restriction and thus establishes a pressure on the two sides of the piston 48 in piston chamber 12 which is different from the pressure in chamber 27, passage 73 and outlet 70.

If the controller 101 is now actuated to bring about a different current flow in coils 22 and 23, armature 25, which is pivoted at 26, will cause a partial closure of one of the valves 19 and 20 and a partial opening of the other valve, the degree of opening depending upon the difference in current in the two coils. Assuming that the current in coil 22 is increased while the current in coil 23 is decreased, valve 20 will partially close and valve 19 will increase its opening. This action will bring about a difference in pressure on opposite sides of piston 48 in the piston chamber 12, since the right-hand side will be opened to the point of lowest pressure in the system, and the left-hand side will be subjected to the pressure in the system which is due to the difference in pressure caused by the restricted passage 69. The right and left-hand sides of the piston chamber 11 will likewise be affected by this difference in pressure, since they are interconnected by passages 82 and 83. Thus pressure in the left-hand side of the piston chamber 11 will decrease while that in the right-hand side will increase.

This pressure differential will cause fluid to flow from chamber 56 through passage 75 to the left-hand side of piston chamber 12 through passage 82 to the right-hand side of piston chamber 11 and will cause movement of piston 28 to the left and piston 48 to the right. This piston movement will cause discharge of fluid from the left-hand side of piston chamber 11 through passage 83 to the right-hand side of piston chamber 12 and this chamber will be discharged through passage 80 and valve 19 to chamber 27 through passage 73 and to the source of fluid pressure. Movement of piston 28 to the left will cause closure or partial closure of valve 40 and a greater opening of the valve 41, and movement of piston 48 to the right will cause closure or partial closure of valve 51 and a greater opening of the valve 52, the degree of movement of the valves 40, 41, 51 and 52, depending upon the degree of movement of valves 19 and 20, which, in turn, depends upon the current differential in coils 22 and 23. As valves 51 and 40 are moved toward closed position, fluid will flow through passage 47, transfer chamber 41 and passage 43, 45 and conductor 97 to act upon one side of the piston 99, Fig. 8 and cause movement of this piston and, therefore, movement of the actuated element 100. As this piston is moved, discharge of fluid from cylinder 98, in which piston 99 moves, will take place through conductor 96, 46, 44, transfer chamber 42, passage 64, 63, chamber 56, passage 66, 67, chamber 13, passage 69 and outlet 70 to the low pressure side of the source of fluid pressure.

It will be seen that this selective operation of the valves 19, 20, 40, 41, 51 and 52 will produce a pressure difference on the two sides of the piston 99 dependent upon the degree of operation of these valves and the direction and speed of operation of the piston 99 will depend upon the amount of this pressure difference.

If it is desired to move the piston 99 in the opposite direction, it is only necessary that the control device 101 be so actuated as to cause greater current flow in coil 23 than in coil 22. This will cause actuation of pistons 48 and 28 in the opposite direction to that just described above, and will cause movement of piston 99 in the opposite direction.

It will be noted that practically all of the work required to operate the valve to direct the fluid through the system is performed by the fluid in the system, and that only a small force or energy is necessary to actuate valves 19 and 20 to bring about the selective operation of the hydraulically-operated main and auxiliary valves. It will also be noted that the speed of movement of the operated piston 99 of the power translating device is governed by the difference in the currents flowing through the windings 22 and 23, since these currents govern the degree of opening of valves 19 and 20, and thus govern the pressure difference in the two sides of the piston chambers 11 and 12.

The piston 48 is made large in comparison with the surface area of valves 51 and 52, so that comparatively small pressures in the piston chamber 12 may control the comparatively large pressures which are applied from the source of fluid pressure to the piston 99 to cause its movement.

The fact that the electromagnetic valve operating device 30 is enclosed within the chamber 27 permits the device to operate with less current than would be required if this device were mounted on the outside of chamber 27, since if it were mounted on the outside it would be necessary to run valve stems through the casing 21. This would require packing the valve stems and the friction between the valve stems and the packing would require additional current for properly operating the valves.

It will be seen that I have provided a pilot control multiplier valve for two-way hydraulic apparatus in which pilot valves which may be operated by small variations in current from a remote point are provided for selecting the direction of operation of the multiplier valve, and, therefore, the hydraulic apparatus in which the flow of fluid to the hydraulic apparatus is governed by main and auxiliary multiplier valves which are operated by the fluid pressure from the source of fluid pressure which operates the hydraulic apparatus, and which will permit different pressures to be applied to the hydraulic apparatus depending upon the degree of variation of current in the pilot valve operating device.

In compliance with the requirements of the patent statutes, I have shown and described herein a preferred embodiment of my invention. It is understood, however, that the invention is not limited to the precise construction shown and described, but is capable of modification by one skilled in the art, the embodiments herein shown being merely illustrative of the principles of my invention.

I claim as my invention:

1. In a hydraulic valve for controlling a hydraulic power translating device which has a movable work member in a fluid chamber; a first transfer chamber in connection with a source of pressure fluid, said fluid chamber on one side of said work member and a fluid discharge; a second transfer chamber in connection with a source of pressure fluid, said fluid chamber on the opposite side of said work member and a fluid discharge; means for maintaining a difference in fluid pressure between said transfer chambers and said fluid discharge; a first reversible hydraulically operated valve for selectively restricting the flow of fluid from the source of pressure fluid to one of said transfer chambers while increasing the flow to the other; a second reversible hydraulically operated valve for selectively increasing the flow from said one transfer chamber to said discharge while restricting the flow from said other transfer chamber to said discharge; means connecting said hydraulically operated valves for operation by said difference in fluid pressure between said transfer chambers and said discharge; and means for selectively moving said valves to cause movements of said work member predetermined directions and amounts.

2. In a hydraulic valve for controlling a hydraulic power translating device which has a movable work member in a fluid chamber; a first transfer chamber in connection with a source of pressure fluid, said fluid chamber on one side of said work member and a fluid discharge; a second transfer chamber in connection with a source of pressure fluid, said fluid chamber on the opposite side of said work member and a fluid discharge; means for maintaining a difference in fluid pressure between said transfer chambers and said discharge; a first reversible hydraulically-operated valve for selectively restricting the flow of fluid from the source of pressure fluid to one of said transfer chambers while increasing the flow to the other; a second reversible hydraulically-operated valve for selectively increasing the flow from said one transfer chamber to said discharge while restricting the flow from said other transfer chamber to said discharge, said first and second hydraulically-operated valves each comprising an operating piston in a piston chamber; means for causing selective operation of said valves in direction and degree comprising an outlet from said piston chambers on each side of said pistons to said discharge, and means for selectively increasing the flow through one of said outlets while decreasing the flow through the other predetermined variable amounts.

3. In a hydraulic valve for controlling a hydraulic power translating device which has a movable work member in a fluid chamber; a first transfer chamber in connection with a source of pressure fluid, said fluid chamber on one side of said work member and a fluid discharge; a second transfer chamber in connection with a source of pressure fluid, said fluid chamber on the opposite side of said work member and a fluid discharge; means for maintaining a difference in fluid pressure between said transfer chambers and said discharge; a first reversible hydraulically-operated valve for selectively restricting the flow of fluid from the source of pressure fluid to one of said transfer chambers while increasing the flow to the other; a second reversible hydraulically-operated valve for selectively increasing the fluid flow from said one transfer chamber to said discharge while restricting the fluid flow from said other transfer chamber to said discharge, said first and second hydraulically-operated valves each comprising an operating piston in a piston chamber; means for causing selective operation of said valves in direction and degree comprising an outlet from said piston chambers on each side of said pistons to said discharge and means for selectively increasing the flow through one of said outlets while decreasing the flow through the other predetermined variable amounts, said last-named selective means comprising two valves and electromagnetic means for selectively opening one while closing the other of said valves predetermined variable amounts.

4. In a hydraulically-operated reversible control valve, a body member having a chamber therein, a piston reciprocable in said chamber, a tubular member secured to the piston and reciprocable thereby in the direction of its axis, the ends of said tubular member acting as valve faces, a valve chamber enclosing each of the ends of said tubular member and having a valve seat so arranged as to cooperate with each of the said valve faces to prevent flow of fluid from said tubular member to said chambers when said valve seats and faces are in contact, said valves being so arranged that one is open when the other is closed, said body member having a second chamber, a second piston reciprocable in said second chamber, a second valve member reciprocable by said piston, a discharge chamber, a passage from each of said valve chambers to said discharge chamber, means whereby said second valve member may decrease the flow of fluid from one of said valve chambers to said discharge chamber while increasing the flow of fluid from the other valve chamber to the discharge chamber, said body member having passages therein for establishing fluid flow communication between the piston chambers on corresponding sides of the respective pistons, there being an opening from the second piston chamber on each side of the second piston to the discharge chamber, there being an inlet to said tubular member from a source of pressure fluid, and a discharge outlet from said discharge chamber to said source of pressure fluid, means between said discharge outlet and said discharge chamber for causing a difference in fluid pressure between said discharge chamber and said discharge outlet, a casing secured to said body member, there being a passage between said second chamber from each side of said second piston to said casing, a pilot valve in each of said passages, electromagnetic means for selectively actuating said pilot valves in opposite directions so that one of said pilot valves may be opened predetermined amounts while the other pilot valve is moved to closing position, there being a passage from said casing to said outlet and a passage from each of said first-named valve chambers for connection with the two operating chambers of a reversible hydraulic device which it is desired to operate.

5. In a system for controlling the flow of fluid to and from a fluid operated power translating device having a fluid inlet and a fluid outlet, first valve means connecting both said inlet and said outlet to a source of pressure fluid simultaneously, pressure fluid operated means for moving said first valve means to selectively control the fluid flow from the source of pressure fluid to said outlet and said inlet simultaneously, conduit means connecting both said inlet and said outlet to a fluid discharge, second valve means for controlling the flow of fluid from said inlet and said outlet through said conduit means simultaneously, pressure fluid operated means operated by the fluid pressure difference in said system between said source of pressure and said discharge for operating said second valve means, conduit means connecting said first valve operating means to the second valve means for the control of the movement of the first valve means by the second valve means, other selectively operable valve means, conduit means extending between said second valve operating means and said other valve means for controlling the fluid pressure difference on the valve operating means, and thereby the movement of the second valve means, by said other valve means.

6. In a system for controlling the flow of pressure fluid to and from a pressure fluid operated reversible power translating device having fluid conducting elements serving as either inlet or outlet for fluid flow to and from the device depending upon the direction of operation of the device, first valve means simultaneously connecting a source of pressure fluid to the conducting elements of the translating device, pressure fluid operated means for moving said first valve means to selectively control the fluid flow from the source of pressure fluid to said conducting elements simultaneously, conduit means connecting a fluid discharge with said conducting elements, second valve means for selectively controlling the flow of fluid between said conduit means and said discharge, pressure fluid operated means operated by the fluid pressure difference in said system between said source of pressure and said discharge for operating said second valve means, conduit means connecting said first valve operating means to the second valve means for the control of the movement of the first valve means by the second valve means, other selectively operable valve means, conduit means extending between said second valve operating means and said other valve means for controlling the direction of fluid pressure difference operating on said second valve operating means and thereby the direction of movement of the second valve means, by said other valve means.

7. In a system for controlling the flow of fluid to and from a pressure fluid operated reversible power translating device having fluid conducting elements serving as either inlet or outlet for fluid flow to and from the device depending upon the direction of operation of the device, first valve means simultaneously connecting a source of pressure fluid to the conducting elements of the translating device, pressure fluid operated means for moving said first valve means to selectively control the fluid flow from the source of pressure fluid to said conducting elements simultaneously, conduit means connecting a fluid discharge with said conducting elements, second valve means for selectively controlling the flow of fluid between said conduit means and said discharge, pressure fluid operated means operated by the fluid pressure difference in said system between said source of pressure and said discharge for selectively operating said second valve means in direction and degree, conduit means connecting said first valve operating means to the second valve means for the control of the movement of the first valve means by the second valve means, other selectively operable valve means, conduit means extending between said second valve operating means and said other valve means for controlling the direction and degree of fluid pressure difference operating on said second valve operating means, and thereby the direction and degree of movement of the second valve means, by said other valve means.

CLINTON R. HANNA.